United States Patent
Van Streun et al.

(10) Patent No.: US 12,129,390 B2
(45) Date of Patent: Oct. 29, 2024

(54) ALKYD FOR PIGMENT PASTE

(71) Applicant: Akzo Nobel Coatings International B.V., Arnhem (NL)

(72) Inventors: Karel Hindrik Van Streun, Arnhem (NL); Eric Harry Jacobus Rijlaarsdam, Alphen aan den Rijn (NL)

(73) Assignee: Akzo Nobel Coatings International B.V., Amsterdam (NL)

( * ) Notice: Subject to any disclaimer, the term of this patent is extended or adjusted under 35 U.S.C. 154(b) by 1074 days.

(21) Appl. No.: 16/772,056

(22) PCT Filed: Dec. 17, 2018

(86) PCT No.: PCT/EP2018/085105
§ 371 (c)(1),
(2) Date: Jun. 11, 2020

(87) PCT Pub. No.: WO2019/121441
PCT Pub. Date: Jun. 27, 2019

(65) Prior Publication Data
US 2021/0071029 A1    Mar. 11, 2021

(30) Foreign Application Priority Data

Dec. 20, 2017   (EP) .................................. 17208977

(51) Int. Cl.
| | |
|---|---|
| C09D 167/07 | (2006.01) |
| C08G 63/48 | (2006.01) |
| C08G 63/52 | (2006.01) |
| C08G 63/91 | (2006.01) |
| C08K 3/013 | (2018.01) |
| C08K 3/22 | (2006.01) |
| C09D 7/61 | (2018.01) |
| C09D 17/00 | (2006.01) |
| C09D 167/08 | (2006.01) |

(52) U.S. Cl.
CPC .......... *C09D 167/07* (2013.01); *C08G 63/48* (2013.01); *C08G 63/52* (2013.01); *C08G 63/918* (2013.01); *C08K 3/013* (2018.01); *C09D 7/61* (2018.01); *C09D 17/007* (2013.01); *C09D 167/08* (2013.01); *C08K 3/22* (2013.01); *C08K 2003/2265* (2013.01)

(58) Field of Classification Search
CPC .. C09D 167/07; C09D 167/08; C09D 17/007; C09D 7/61; C08K 3/013; C08K 3/22; C08G 63/48; C08G 63/52; C08G 63/918
See application file for complete search history.

(56) References Cited

U.S. PATENT DOCUMENTS

| | | | |
|---|---|---|---|
| 3,040,000 A | 6/1962 | Stephens et al. | |
| 4,555,564 A | 11/1985 | Fischer et al. | |
| 5,578,675 A * | 11/1996 | Mormile | C08G 71/00 524/871 |
| 2014/0256860 A1* | 9/2014 | Ortiz | C09D 167/08 524/100 |
| 2016/0114338 A1* | 4/2016 | Snead | C07C 233/36 252/61 |

FOREIGN PATENT DOCUMENTS

| | | | |
|---|---|---|---|
| CN | 101353421 | 1/2009 | |
| CN | 101831061 | * 9/2010 | ............. C08G 63/49 |
| CN | 103497319 | 1/2014 | |
| CN | 105085879 | 11/2015 | |
| CN | 106366323 | 2/2017 | |
| EP | 0012964 | 7/1980 | |
| EP | 0311209 | 4/1989 | |
| EP | 0507202 | 10/1992 | |
| EP | 0673983 | 9/1995 | |
| EP | 0744667 | 11/1996 | |
| EP | 1401972 | 6/2008 | |
| JP | H08209059 | 8/1996 | |
| JP | 2004143421 | 5/2004 | |
| WO | 02096997 | 12/2002 | |
| WO | 2019121441 | 6/2019 | |

OTHER PUBLICATIONS

Duce, C. et al., "Alkyd artists' paints: Do pigments affect the stability of the resin? A TG and DSC study on fast-drying oil colours," Polymer Degradation and Stability 105 (2014) 48-58 (11 pages).
Gupta, R.C. et al., "Determination of iodine numbers of edible oils," Biochemical Education, vol. 22, No. 1, Jan. 1, 1994, p. 47 (1 page).
Holmberg, Krister "Alkyd Resins," Chapter 51, Coatings Technology Handbook, Third Edition, 2006, edited by Arthur A. Tracton (12 pages).
"International Preliminary Report on Patentability," for PCT Application No. PCT/EP2018/085105 mailed Nov. 26, 2019 (6 pages).
"International Search Report and Written Opinion," for PCT Application No. PCT/EP2018/085105 mailed Mar. 14, 2019 (13 pages).
Scholz, et al., "Prospects and Risks of the use of Castor Oil as a Fuel," Biomass and Bioenergy, vol. 32, No. 2, Oct. 17, 2007 pp. 95-100 (6 pages).

* cited by examiner

*Primary Examiner* — Pegah Parvini
(74) *Attorney, Agent, or Firm* — Pauly, DeVries Smith & Deffner LLC

(57) ABSTRACT

The embodiments herein provide a solvent borne pigment paste comprising an alkyd, where the alkyd is obtainable by a process including the steps of a. producing an OH-functional alkyd from a non-drying oil or fatty acid, one or more polyols, and a first anhydride; where the non-drying oil or fatty acid has an iodine number ≥115; b. esterification of the OH-functional alkyd with trimellitic anhydride (TMA), where at least 80% of the esterified TMA residues has two free carboxylic groups. In some embodiments, at least 85%, at least 90%, or at least 98% of the esterified TMA residues has two free carboxylic groups.

19 Claims, 2 Drawing Sheets

Figure 1

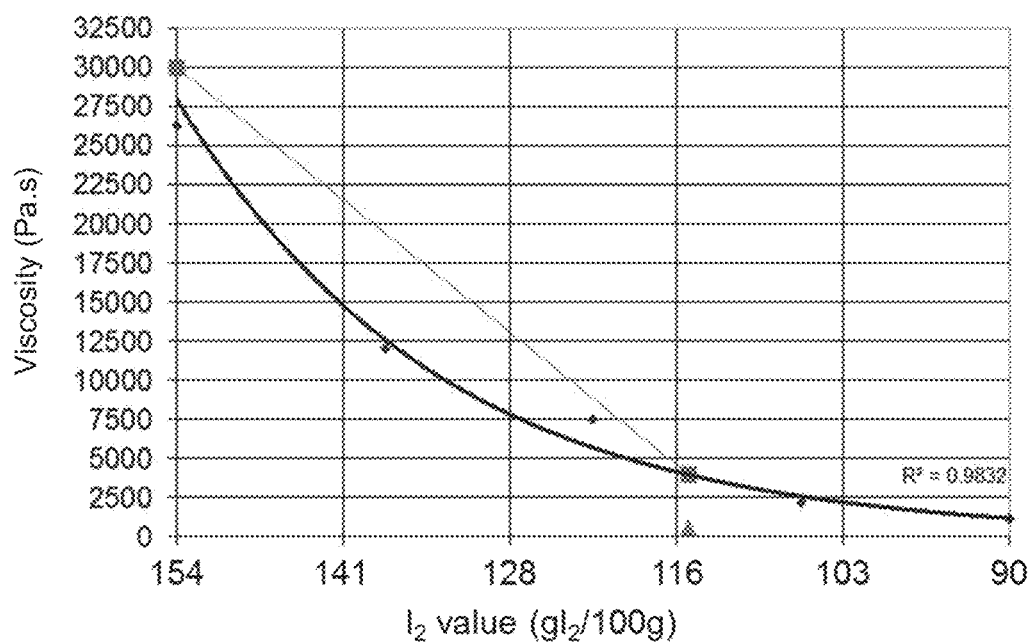

- ♦ Reference compound 1 – 5 (all without anti-oxidant);
- ——— line is fitted through the ♦ points.
- ✶ Oscillated Rheology of Reference compound 1 without anti-oxidant (left) and with anti-oxidant (right). The position of the oscillated rheology with anti-oxidant has been fitted to the black line
- ——— Light gray line is fitted through these 2 points.
- ▲ Iodine number where the black line has an oscillated rheology equal to that of Reference compound 1 with anti-oxidant; i.e. 115

# ALKYD FOR PIGMENT PASTE

CROSS REFERENCE TO RELATED APPLICATION(S)

This application is a national stage application under 35 U.S.C. 371 of International Patent Application Serial No. PCT/EP2018/085105, entitled "Alkyd For Pigment Paste," filed Dec. 17, 2018, which claims priority from EP Application No. EP17208977.3, filed Dec. 20, 2017, the disclosures of which are hereby incorporated by reference herein in their entirety."

FIELD OF THE TECHNOLOGY

The embodiments herein relate to a pigment paste comprising an alkyd and one or more iron oxide pigments, wherein the alkyd is obtainable by a process comprising the steps of a) producing an OH-functional alkyd from a non-drying oil or fatty acid, one or more polyols, and a first anhydride; wherein the non-drying oil or fatty acid has an iodine number 115; b. esterification of the OH-functional alkyd with trimellitic anhydride (TMA); wherein at least 80% of the esterified TMA residues has two free carboxylic groups.

The embodiments herein further relate to coatings, and in some embodiments to architectural coatings comprising such a pigment paste.

BACKGROUND

In the paint industry, stock control and logistics are rationalized by using color mixing systems. In such systems, a paint color selected by a user is produced by selecting a base paint from a number of available base paints and tinting the selected base paint with the aid of one or more pigment pastes. Such systems are for example used in the field of decorative coatings. EP-A0311209 discloses such a system.

Examples of pigment pastes for paint tinting systems are disclosed in EP-A0012964 and EP-A0507202. Next to pigments, pigment pastes typically include resins, solvents, and in general also additives. Pigments of the various colors vary considerably in nature. For each pigment, a compatible resin needs to be used. This resin needs, in turn, to be compatible with the binder system of the used base paints and with resins of the other pigment pastes as well, since for most colors, the addition of more than one pigment paste is required. The resin should also be able to disperse a sufficient amount of the pigment. This system of a limited number of base paints and several pigment pastes allows the generation of a wide gamut of colors. Usually a tinting machine uses nine to sixteen different colorants to produce this gamut of colors.

Solvent borne yellow and red pigment pastes are well-known in the art. In these pastes the pigments are dispersed in a solvent borne alkyd. The pigments can be iron-based. Such pigment pastes can be used to adjust the color of a base paint, for example using a tinting machine. Pigment pastes are known from WO2002096997.

In U.S. Pat. No. 4,555,564 is for example disclosed a process for synthesizing an alkyd resin composition comprising a) condensing a carboxylic acid with an alcohol to form a polyester precondensate having terminal hydroxyl groups; b) converting said precondensate into an acidic precondensate by further condensation with a polycarboxylic acid anhydride until an acid number of about 50 to 130 is obtained; and c) forming an alkyd resin by further esterification of said acidic precondensate with a further alcohol.

In EP0744667 is disclosed a toner for developing an electrostatic image comprising toner particles wherein said toner particles comprise at least a binder resin, a colorant, a polar resin and a release agent. The polar resin has at least one terminal group which has been modified by a polycarboxylic acid having at least three carboxyl groups.

In EP1401972 is disclosed a pigment paste for tinting a coating composition, the pigment paste comprising at least one branched alkyd having a viscosity below 5 Pa·s, at 23° C. at a shear rate of 100 $s^{-1}$ and one or more pigments. The pigment paste was prepared from an alkyd from tall oil fatty acid.

Solvent borne alkyds used for pigment pastes can be prepared from different oils or fatty acids, such as but not limited to, sunflower oil, soya bean oil, tall oil fatty acid (TOFA). Such alkyds have good properties in pigment paste. A drawback of pigment pastes comprising iron oxide pigments, is that the viscosity of the pigment pastes, especially the yellow and red ones, tends to increase when exposed to air. This increase of viscosity can ultimately lead to gelation and the formation of big lumps of very hard material. Hard materials of pigment paste in pigment paste canister are undesirable and create a need to replace such canisters in tinting machines, which is very costly.

The speed of gelation can be reduced by adding an anti-oxidant or an anti-skinning agent such as for example Methyl Ethyl KetOxime (MEKO)). However, the tolerated use of these materials is limited or is likely to be limited due to legislation to improve the protection of human health and the environment such as REACH (EC 1907/2006). In addition, antioxidants may increase the drying of the final coating considerably.

There is thus a need in the art for alternative colorant systems that do not suffer from gelling (i.e. gelation) of the pigment paste over time. The colorant system can include the same compatibility with base paints it should replace such as sunflower, soya bean oil, tall oil, etc. based pigment paste.

The object of the embodiments herein is to provide a pigment paste that is stable over time e.g. the viscosity and colloidal stability remain constant. In other words, the pigment paste does not suffer from gelling over time. The pigment paste comprising a resin which is compatible with all types of pigments, in particular iron oxide-based pigments. The resin should have sufficient dispersing and wetting power to disperse and stabilize the pigments. In various embodiments, it should be possible to use the pastes for tinting high solids paints and the paste should not have a substantially negative effect on the viscosity, applicability, drying, stability or VOC level of the paint to be mixed.

SUMMARY

In an embodiment, a solvent borne pigment paste can include an alkyd and one or more iron oxide pigments, wherein the alkyd is obtainable by a process can include the steps of a. producing an OH-functional alkyd from a non-drying oil or fatty acid, one or more polyols, and a first anhydride, wherein the non-drying oil or fatty acid has an iodine number 115, b. esterification of the OH-functional alkyd with trimellitic anhydride (TMA) at a temperature 220° C. to obtain an alkyd with esterified TMA residues, wherein at least 80% of the esterified TMA residues has two free carboxylic groups. In some embodiments, at least 85%, at least 90%, at least 95%, or at least 98% of the esterified TMA residues has two free carboxylic groups. In various embodiments, the acid value of the alkyd is between 15 and 30 mg KOH/g, wherein the iodine number is determined according to ISO 3961 and the acid value is determined according to ISO 2114.

In an embodiment, wherein esterification of the OH-functional alkyd with trimellitic anhydride (TMA) is at a temperature between 100° C. and 200° C., or between 100° C. and 180° C., or between 100° C. and 150° C.

In an embodiment, wherein the amount of fatty acid with 18 carbon atoms and two double bonds (C18:2) and C18:3 in the non-drying oil or fatty acid is less than 20 wt %. In some embodiments, the amount of 018:2 and C18:3 in the non-drying oil or fatty acid is less than 5 wt %.

In an embodiment, wherein the amount of fatty acids with less than 16 carbon atoms (<C16) in the non-drying oil or fatty acid is less than 10 wt % or less than 6 wt %. In some embodiments, the amount of fatty acids without unsaturations (C16:0) and fatty acids with 16 carbon atoms and one unsaturation (016:1) in the non-drying oil or fatty acid is less than 15 wt %, or less than 10 wt %.

In an embodiment, wherein the iodine number of the non-drying oil or fatty acid is 100 and >15 $I_2$/100 g.

In an embodiment, wherein the amount of fatty acid with 18 carbon atoms and one double bond (C18:1) and isostearic acid in the non-drying oil or fatty acid is 40 wt %.

In an embodiment, wherein the non-drying oil or fatty acid includes more than 52 wt % of oleic acid.

In an embodiment, wherein the one or more polyols include at least one member selected from the group consisting of glycerol and pentaerythritol and wherein the first anhydride includes at least one member selected from the group consisting of phthalic anhydride and hexahydrophthalic anhydride.

In an embodiment, wherein the alkyd has a Number Average Molecular Weight (Mn) of between 2000 and 3500 Da, or wherein the Weight Average Molecular Weight (Mw) is between 5000 and 10,000 Da, and/or wherein the Mw/Mn ratio is between 1 and 3, wherein Mn and Mw are measured using Gel Permeation Chromatography using polystyrene standards.

In an embodiment, wherein the acid value of the OH-functional alkyd is between 10 and 25 mg KOH/g, between 12 and 17 mg KOH/g, or between 13.5 and 16 mg KOH/g.

In an embodiment, wherein the acid value of the alkyd is between 16 and 25 mg KOH/g, or between 18 and 22 mg KOH/g.

In an embodiment, wherein the pigment paste includes at least 15 wt % of the alkyd, or wherein the pigment paste includes between 50 wt % and 90 wt % of the alkyd.

In an embodiment, wherein the iron oxide pigments are selected from the group consisting of yellow iron oxide, orange iron oxide, red iron oxide, brown iron oxide and black iron oxide, or mixtures thereof.

In an embodiment, wherein the iron oxide pigments are transparent iron oxide pigments.

In an embodiment, a coating including a pigment paste is included.

It has now been found that substituting a drying oil for a non-drying oil or fatty acid having an iodine number 115 combined with an esterification of free hydroxyl groups of the alkyd with trimellitic anhydride (TMA) wherein at least 80% of the esterified TMA residues has two free carboxylic groups, provides a resin that is suitable for use as a colorant and that does not gel over time when exposed to air.

Accordingly, the present embodiments herein provide a solvent borne pigment paste comprising an alkyd and one or more iron oxide pigments wherein the alkyd is obtainable by a process comprising the steps of
a. producing an OH-functional alkyd from a non-drying oil or fatty acid, one or more polyols, and a first anhydride; wherein the non-drying oil or fatty acid has an iodine number 115;
b. esterification of the OH-functional alkyd with trimellitic anhydride (TMA) at a temperature 220° C. to obtain an alkyd with esterified TMA residues;
wherein at least 80% of the esterified TMA residues has two free carboxylic groups, or wherein at least 85%, 90%, 95%, or even at least 98% of the esterified TMA residues has two free carboxylic groups, wherein the acid value of the alkyd is between 15 and 30 mg KOH/g.

The pigment paste described herein does not gel when exposed to air; it is understood that reference to a "pigment paste according described herein that does not gel" means that no gelling or at least less gelling of the pigment paste occurs in comparison with a similar pigment paste based on tall oil fatty acid, without TMA, when exposed to air. Accordingly, in one aspect the embodiments herein relate to a pigment paste comprising the alkyd as herein defined.

A coating composition, including an architectural coating composition, may be produced in a process comprising the steps of a) providing a pigment paste according to the embodiments herein, b) adding a desired amount of the pigment paste to a base coat and optionally mixing the base coat with the desired amount of pigment paste. Architectural coatings obtained in such a process are yet another aspect of the embodiments herein.

BRIEF DESCRIPTION OF THE FIGURES

FIG. 1 shows the viscosity after 3 days of drying of reference compounds 1 to 5 in (Pa·s) as a function of the iodine number; and of reference compound 1 with antioxidant. The viscosity of reference compound 1 with antioxidant has been fitted to the black line drawn through the viscosity of reference compounds 1-5.

DETAILED DESCRIPTION

Figure 2:
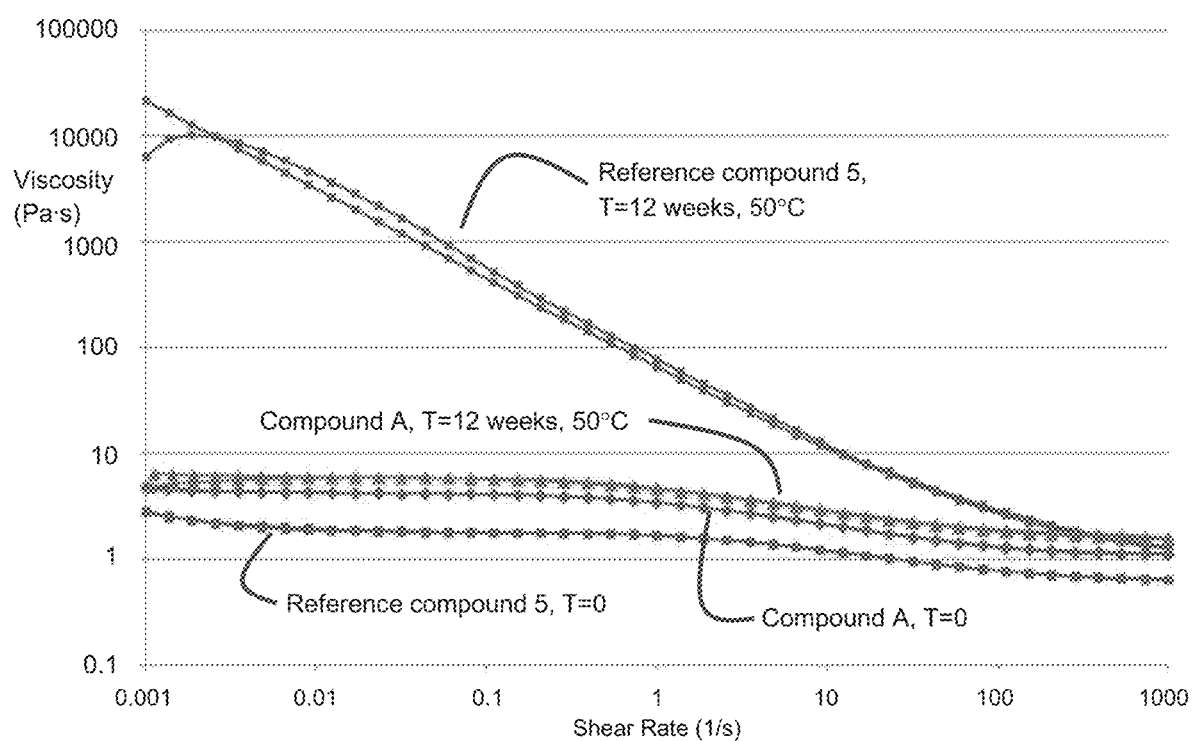
FIG. 2 shows the viscosity (Pa·s) of Reference compound 5 and Compound A at T=0 (fresh prepared) and after 12 weeks of storage at 50° C. (T=12 weeks, 50° C.).

Non-drying oils or fatty acids with an iodine number 115 are well known in the art. Examples of such oils and corresponding acids include, but are not limited to palm oil, olive oil, coconut oil, tallow oil, palm kernel oil, cocoa butter, jojoba oil, cottonseed oil, corn oil, Peanut oil. Likewise mixtures of oils can be used. It is understood that the iodine value of one or more of the fatty acids in such a mixture may be higher than 115, as long as the iodine value of the total mixture of fatty acids is below or equal to 115. Alternatively, mixtures of different oils can be used; it is understood that the iodine value of one or more of the individual oils in such a mixture may be higher than 115, as long as the iodine value of the total mixture of oils is below or equal to 115.

The inventors have found that alkyds based on fatty acids with an iodine number below or equal to 115 suffer less from auto-oxidation. Auto-oxidation is a known problem of alkyds resulting in gelling of pigment pastes prepared from such alkyds. Pigment pastes which do not suffer from auto-oxidation normally do not have sufficient colloidal stability. If the colloidal stability of the pigment paste is too low, different components of the paste may (partially) separate. The inventors surprisingly found that an alkyd based on a fatty acid with an iodine number below or equal to 115 and substituted with TMA (as herein described) does not suffer from auto-oxidation and at the same time provides good colloidal stability of a pigment paste prepared from such an alkyd.

In one embodiment the amount of amount of C18:2 and C18:3 in the non-drying oil or fatty acid used in the production of the alkyd in the pigment paste described herein, is less than 20 wt %; e.g. less than 15 wt % or even less than 10 wt %. In some embodiments, the amount of C18:2 and C18:3 in the non-drying oil or fatty acid is less than 5 wt %, e.g. less than 4 wt %, less than 3 wt % or even less than 2 wt %. In one embodiment the amount of fatty acids with conjugated double bonds is less than 5 wt %. It is understood that C18:2 refers to a fatty acid with 18 carbon atoms and 2 double bonds (e.g. linoleic acid). Likewise C16:1 refers to a fatty acid with 16 carbon atoms and 1 double bond (e.g. palmitoleic acid); and C18:1 refers to a fatty acid with 18 carbon atoms and 1 double bond (e.g. vaccenic acid, oleic acid, elaidic acid).

In order to get a pigment paste with sufficient colloidal stability, the fatty acid used to prepare the alkyd in the pigment paste described herein must have a sufficiently high molecular weight and/or be branched and/or sufficient length of the fatty acid. The skilled person will know how to vary the oil in order to get the desired characteristics of the pigment paste.

In one aspect, the amount of <C16 in the non-drying oil or fatty acid used in the production of the alkyd in the pigment paste described herein is less than 10 wt % e.g. less than 6 wt % or even less than 4 wt %. It is understood that <C16 refers to fatty acids with less than 16 carbon atoms.

In another aspect, the amount of C16:0 and C16:1 in the non-drying oil or fatty acid used in the production of the alkyd in the pigment paste described herein is less than 15 wt % e.g. less than 10 wt % or even in another aspect less than 8 wt %. It is understood that C16:0 refers to fatty acids with 16 carbon atoms and no unsaturations, likewise C16:1 refers to fatty acids with 16 carbon atoms and one unsaturation (i.e. one carbon-carbon double bond).

In one aspect the non-drying oils or fatty acids used in the production of the alkyd in the pigment paste described herein have an iodine number 100. Pigment pastes with a good colloidal stability can in one embodiment be obtained using C18:1 and/or isostearic acid in the production of the alkyd in the pigment paste described herein. In one aspect the amount of C18:1 and isostearic acid (i.e. the combined amount) in the non-drying oil or fatty acid is used in the production of the alkyd in the pigment paste described herein is 40 wt %. In another aspect the non-drying oils or fatty acids used in the production of the alkyd in the pigment paste described herein have an iodine number 100 and the amount of C18:1 and isostearic acid in the non-drying oil or fatty acid is 40 wt %. In another aspect, the non-drying oils or fatty acids used in the production of the alkyd in the pigment paste described herein have an iodine number which is >15 g $I_2$/100 g, e.g. at least 20, 25, 30, 35, 40, or even at least 45 g $I_2$/100 g.

In still another aspect, the non-drying oil or fatty acid used in the production of the alkyd in the pigment paste described herein comprises more than 52 wt % of oleic acid, e.g. more than 55 wt %, 60 wt % or even more than 65 wt %. In one embodiment the amount of oleic acid is more than 70 wt %.

A disadvantage of transparent iron oxide-containing pigment pastes known in the art is that their viscosity increases over time. An extreme form of viscosity increase is gelling of the pigment paste (gelling being a state wherein the pigment paste behaves as a solid). This is undesirable as a too high increase of viscosity makes the paste unsuitable for use. This problem is solved by the current embodiments. Viscosity of a pigment paste can be determined using methods known in the art such as Brookfield viscosity (e.g. using ASTM D2196). Oscillated Rheology is a test to determine stability of a pigment paste over time as described elsewhere herein.

In still another aspect, the viscosity of a pigment paste described herein and further comprising 1 wt % of iron oxide does not increase with more than 10% when exposed to air for 2 months or more, (e.g. 3, 4, 5, 6, 7, 8, 10, 12, 16, 20, 24 months). In one embodiment the viscosity of such a composition comprising at least 10 wt % of the alkyd and further comprising at least 1 wt % of iron oxide does not increase with more than 10% exposed to air for 2 months or more, (e.g. 3, 4, 5, 6, 7, 8, 10, 12, 16, 20, 24 months).

In one aspect, at least 88%, 90%, 93%, 95%, 96%, or even at least 98% of the esterified TMA residues in the alkyd in the pigment paste described herein has two free carboxylic groups. In one aspect, the non-drying oils or fatty acids with an iodine number 115 used to prepare the alkyd in the pigment paste described herein comprise more than 53 wt % of oleic acid, e.g. more than 54 wt %, 55 wt %, 56 wt %, 57 wt %, 58 wt %, 59 wt %, 60 wt %, 61 wt %, 62 wt %, 63 wt % or even more than 65 wt %, such as more than 70 wt %, 75 wt %, 80 wt %, 85 wt % or more. In one embodiment the fatty acid comprises more than 90 wt % of oleic acid, e.g., 95 wt % or more.

The one or more polyols used in the process to prepare the alkyd as disclosed herein can be chosen from any type of polyol known in the art alkyd preparation. A polyol is herein defined as a polyhydric alcohol containing two or more hydroxyl groups and includes diols and triols. Examples of such polyols are 1,3-propane diol, 1,2-ethane diol, 1,4-butane diol, 1,5-pentane diol, and 1,6-hexane diol. Suitable branched diols are for instance dimethylol propane, neopentyl glycol, 2-propyl-2-methyl-1,3-propane diol, 2-butyl-2-ethyl-1,3-propane diol, 2,2-diethyl-1,3-propane diol, 1,2-propane diol, 1,3-butane diol, 2,2,4-trimethylpentane-1,3-diol, trimethylhexane-1,6-diol, 2-methyl-1,3-propane diol, diethylene glycol, triethylene glycol, polyethylene glycols, dipropylene glycol, tripropylene glycol, and polypropylene glycols. Suitable cycloaliphatic diols are for example cyclohexane dimethanol and cyclic forms of pentaerythritol, and 1,3-dioxane-5,5-dimethanol. Suitable aromatic diols are for instance 1,4-xylylene glycol and 1-phenyl-1,2-ethane diol, and the reaction products of polyfunctional phenolic compounds and alkylene oxides or derivatives thereof.

Suitable triols are for example trimethylol propane, trimethylol ethane, trimethyloi butane, 3,5,5-trimethyl-2,2-dihydroxymethylhexane-1-ol, glycerol, and 1,2,6-hexane triol. Alternatively, cycloaliphatic and aromatic triols and/or corresponding adducts with alkylene oxides or derivatives thereof can be used. Suitable tetrols are for example pentaerythritol, ditrimethylol propane, diglycerol and ditrimethylol ethane. It is also possible to use cycloaliphatic and aromatic tetrols as well as corresponding adducts with alkylene oxides or derivatives thereof.

In one embodiment the one or more polyols used in the preparation of the alkyd in the pigment paste described herein are selected from one or more of the group consisting of pentaerythritol, glycerine, trimethylol propane, trimethylol ethane, ethylene glycol, neopentyl glycol, propylene glycol and cyclohexanedimethanol. In another embodiment, the one or more polyols used in the preparation of the alkyd in the pigment paste described herein are selected from one or more of the group consisting of glycerol, trimethylol propane (TMP), and pentaerythritol. In another embodiment the one or more polyols used to prepare the alkyd in the pigment paste described herein comprise at least one member selected from the group consisting of glycerol, trimethylolethane, trimethylolpropane (TMP), pentaerythritol, sorbitol, 1,2,6-hexanetriol, 1,1,4,4-tetrakis(hydroxymethyl) cyclohexane, tris(hydroxyethyl) isocyanurate, tripentaerythritol, and dipentaerythritol. In various embodiments, the one or more polyols are glycerol and pentaerythritol.

Likewise, the first anhydride used in the process to prepare the alkyd in the pigment paste described herein can be chosen from any type of anhydride known in the art of alkyd preparation. One of ordinary skill in the art will recognize that polycarboxylic acids may also be used. In other words, the first anhydride used in the process to prepare the alkyd in the pigment paste described herein can be polycarboxylic acid or the anhydrides of such polycarboxylic acid. Suitable polycarboxylic acid or anhydride utilized in the embodiments herein may comprise, but are not limited to, one or more of malonic acid, glutaric acid, pimelic acid, suberic acid, azelaic acid, sebacic acid, succinic acid, adipic acid, phthalic acid, isophthalic acid, terephthalic acid, 1,4-cyclohexanedicarboxylic acid, 1,3-cyclohexanedicarboxylic acid, hexahydrophthalic anhydride, tetrahydrophthalic anhydride, trimellitic acid, phthalic anhydride, maleic anhydride, fumaric acid, tricarballylic, 3,3'4, 4'-benzophenone tetracarboxylic acid, 1,1,3-trimethyl-5-carboxyl (p-carboxyphenyl) indan, lower alkyl substituted phthalic acids, tetrahydrophthalic acid, and dimerized fatty acids. Lower alkyl is herein defined as a linear or branched alkyl group comprising up to 6 carbon atoms; optionally a lower alkyl group may be unsaturated. In one embodiment the first anhydride comprises at least one member selected from the group consisting of maleic anhydride, phthalic anhydride, orthophthalic anhydride, hexahydro-phthalic anhydride, tetrahydro-phthalic anhydride, terephthalic anhydride. In another embodiment, the first anhydride comprises at least one member selected from the group consisting of is phthalic anhydride or hexahydro-phthalic anhydride; and in some embodiments the first anhydride comprises hexahydro-phthalic anhydride. In one embodiment, in the process to prepare the alkyd in the pigment paste described herein, the one or more polyols comprises at least one members selected from the group consisting of glycerol, trimethylol propane (TMP), and pentaerythritol; and/or wherein the first anhydride comprises at least one member selected from the group consisting of is phthalic anhydride or hexahydro-phthalic anhydride; and in some embodiments the one or more polyols are glycerol and pentaerythritol; and the first anhydride is hexahydro-phthalic anhydride. In another embodiment, in the process to prepare the alkyd in the pigment paste described herein as mentioned above, the one or more polyols are glycerol and pentaerythritol; and the first anhydride is hexahydro-phthalic anhydride.

Alkyds can be classified based on a wide range of properties such as oil length and acid value see for example Coatings Technology Handbook, Second Edition edited by D. Satas, Arthur A. Tracton pages 435-437, which is included herein by reference.

"Oil length" is defined as weight % of oil calculated on the theoretical non-volatile content of the final alkyd when condensed to the midpoint of the acid value specification: very long oil: 75% and over; long oil: between 60 and 75%; medium oil: between 45 and 60%; short oil: up to 45%.

In one aspect the oil length of the alkyd in the pigment paste described herein is 55%, or the oil length is 60%, or the oil length is 65%; or in another embodiment, the oil length is between 60 and 70%. In some embodiments, the oil length is between 64 and 68%.

In another aspect the number average molecular weight (Mn) of the alkyd in the pigment paste described herein is between 2000 and 3500 Da, in one embodiment between 2500 and 3000 Da, in another embodiment between 2750 and 3000 Da. The Mn and the weight average molecular weight (Mw) can be determined using GPC as defined elsewhere herein. In yet another aspect, the weight average molecular weight (Mw) of the alkyd in the pigment paste described herein is between 4000 and 10,000 Da, in one embodiment between 5000 and 10,000 Da, in another embodiment 5000 and 8000 Da, or between 6000 and 7000 Da. In still another aspect, the Mw/Mn ratio of the alkyd in the pigment paste described herein is between 1 and 3, or between 2 and 3, more or between 2.0 and 2.6.

In still another aspect the Mn of the OH-functional alkyd obtained from a fatty acid, one or more polyols, and a first anhydride; wherein the fatty acid comprises more than 52 wt % of oleic acid—as produced during the production process of the alkyd in the pigment paste described herein—is between 2000 and 3500, in one embodiment between 2700 and 3000 Da. The weight average molecular weight (Mw) of the OH-functional alkyd is between 5000 and 10,000 in one embodiment between 5000 and 8000 Da In still another aspect, the Mw/Mn ratio of the OH-functional alkyd is between 1 and 3, or between 2 and 3.

In one embodiment the alkyd in the pigment paste described herein does not comprise benzoic acid; in another embodiment, the alkyd in the pigment paste described herein has not been modified, e.g. not been esterified by benzoic acid.

In one aspect the alkyd in the pigment paste described herein has a Tg of −10° C., or −30° C., or between −45 and −55° C. In one embodiment the Tg is determined using DSC, e.g. using the method as described by Duce et al (Polymer Degradation and Stability 105 (2014) pp 48-58), in particular paragraph 2.3. Equipment and measurements which is incorporated by reference.

"Acid value" is herein defined as the number of milligrams of potassium hydroxide required to neutralize one gram of the polymer under the conditions specified below (IUPAC definition). It is determined using a standard potassium hydroxide solution (0.1 N) in methanol and a one percent of phenolphthalein in ethanol (95 percent) as indicator. An ethanol-toluene mixture is prepared by mixing equal volumes of ethanol (95 percent) and toluene and neutralized with a methanolic potassium hydroxide solution (0.1 N) in the presence of phenolphthalein as indicator. 1-2 g of the sample is dissolved in 50 ml of the ethanol-toluene mixture. The solution is titrated with methanolic potassium hydroxide solution in the presence of phenolphthalein as indicator. The acid value is calculated as follows:

$$\text{Acid value} = 56.1 aN/p.$$

Wherein a=ml methanolic potassium hydroxide solution
N=normality of the methanolic potassium hydroxide solution p=weight of the sample in g (see Recommended methods for the analysis of alkyd resins by IUPAC: https://www.iupac.org/under subpage publications/pac-2007/1973/pdf/3302x0411.pdf.)

In one aspect the acid value of the OH-functional alkyd—as produced during the production process of the alkyd in the pigment paste described herein is between 10 and 25 mg KOH/g, in one embodiment between 12 and 17 mg KOH/g, or in another embodiment between 13.5 and 16 mg KOH/g. The acid value of the alkyd is between 15 and 30 mg KOH/g, in one embodiment between 16 and 25 mg KOH/g or even between 18 and 22 mg KOH/g. In another embodiment the acid value of the OH-functional alkyd is between 12 and 17 mg KOH/g and the acid value of the alkyd is between 16 and 25 mg KOH/g.

The alkyd in the pigment paste described herein can be dissolved in a liquid medium. It is understood that a liquid medium as herein referred to is a medium which is preferably liquid at 298 K. In one aspect such a composition comprises between 50 and 90 wt %, or between 70 and 80 wt %, or between 75 and 85 wt % of the alkyd. Suitable solvents for the alkyd are aliphatic hydrocarbons, e.g. aliphatic hydrocarbons predominantly comprising C10-C12 paraffins and naphthenes. The viscosity of such compositions may vary upon the type of liquid medium used. In one embodiment the viscosity at 25° C. is between 0.05 and 10 Pa·s, as determined according to the method defined elsewhere herein and at a shear rate of $10\ s^{-1}$, (23° C.), measured according to ISO3219; or between 0.1 and 5 Pa s, or between 0.2 and 2 Pa s.

Solutions of the alkyd can be used to prepare color pastes. In one embodiment a solution of the alkyd has a colour 8 as determined using the Gardner Colour scale as specified in ASTM D1544.

The embodiments herein relate to a pigment paste, i.e. a colour paste, comprising the alkyd as defined herein. In one embodiment such a pigment paste comprises more than 10 wt % of the alkyd, e.g. more than 15 wt %, 20 wt %, 25 wt % or even more than 30 wt %. In another embodiment, the pigment paste comprises more than 35 wt % or even more than 40 wt % of the alkyd. In another aspect, the embodiments herein relate to a pigment paste comprising at least 50 wt % of the alkyd. In still another aspect, the embodiments herein relate to a pigment paste comprising at least 60 wt % of the alkyd, e.g. at least 70 wt %, 80 wt % or even at least 90 wt %.

The embodiments herein relate to a pigment paste, i.e. a colour paste, comprising the alkyd as herein defined and further comprising one or more metal-based pigments. Metal based pigments are well-known in the art and include cadmium pigments: cadmium yellow, cadmium red, cadmium green, cadmium orange, cadmium sulfoselenide; Chromium pigments: chrome yellow and chrome green-|viridian; Cobalt pigments: cobalt violet, cobalt blue, cerulean blue, aureolin (cobalt yellow); Copper pigments: Azurite, Han purple, Han blue, Egyptian blue, Malachite, Paris green, Phthalocyanine Blue BN, Phthalocyanine Green G, Verdigris; Iron oxide pigments: sanguine, caput mortuum, oxide red, red ochre, Venetian red, Prussian blue; Lead pigments: lead white, cremnitz white, Naples yellow, red lead, lead-tin-yellow; Manganese pigments: manganese violet; Mercury pigments: vermilion; Titanium pigments: titanium yellow, titanium beige, titanium white, titanium black; Zinc pigments: zinc white, zinc ferrite, zinc yellow.

In one embodiment the pigment paste, i.e. a colour paste, comprising the alkyd as herein defined and further comprising one or more metal-based pigments comprises at least 1 wt % of metal-based pigment and more than 10 wt % of the alkyd described herein, e.g. more than 15 wt %, 20 wt %, 25 wt % or even more than 30 wt %. In another embodiment, the pigment paste comprises more than 35 wt % or even more than 40 wt % of the alkyd. In another aspect, the embodiments herein relate to a pigment paste comprising at least 25 wt % of the alkyd and further comprising at least 2 wt % of a metal-based pigment. In still another aspect, the embodiments herein relate to a pigment paste comprising at least 2 wt % of a metal-based pigment and further comprising at least 30 wt % of the alkyd described herein, e.g. at least 40 wt %.

Iron Oxides are, behind Titanium Dioxide and Carbon Black, the most widely used pigments in the world. Their variety of colors (red, yellow, black, brown) and excellent performance/cost ratio make them fit into lots of different applications. Iron oxide pigments include but are not limited to Iron Oxide Yellow: Hydrated ferric oxide, hydrated iron (III) oxide; Iron Oxide Red: Iron sesquioxide, anhydrous ferric oxide, anhydrous iron (III) oxide; Iron Oxide Black: Ferroso ferric oxide, iron (II,III) oxide; C.A.S. number Iron Oxide Yellow: 51274-00-1; C.A.S. number Iron Oxide Red: 1309-37-1; C.A.S. number Iron Oxide Black: 1317-61-9. Such pigments are commercially available e.g. from Bayferrox, Nubiola, Huntsman, or Ferro or others.

Iron oxide pigments can be synthetic or natural. They can be selected from the group consisting of yellow iron oxide, orange iron oxide, red iron oxide, brown iron oxide and black iron oxide, or mixtures thereof. In some embodiments, iron oxide pigments are selected from the group consisting of red iron oxide, yellow iron oxide and brown iron oxide or mixtures thereof. In one embodiment, the iron oxide pigments are yellow or red iron oxide pigments.

Iron oxide pigments which have an average particle size less than 0.1 micron are considered to be transparent because they can transmit visible light. Stated in another way, "transparent pigment" is pigment having a majority of the particles smaller than the wave length of light. Iron oxide pigments which have an average particle size greater than 0.1 microns and which cannot transmit light are considered to be opaque. In one embodiment transparent iron oxide pigments are yellow or red iron oxide pigments or mixtures thereof. In one embodiment the transparent iron oxide particles are acicular in nature with dimensions of less than 20 nanometers wide by less than 150 nanometers long (Paints and Coatings Industry, Using Transparent Iron Oxide Pigments in Wood Finish Applications Oct. 23, 2000 available at https://www.pcimag.com/ at sub-page articles/86750-using-transparent-iron-oxide-pigments-in-wood-finish-applications). Transparent iron oxide particles are commercially available, e.g. from BASF or Huntsman.

The embodiments herein relate to a colour paste (i.e. pigment paste) comprising the alkyd as herein defined, further comprising one or more iron oxide pigments. In one embodiment such a pigment paste comprises more than 10 wt % of the alkyd described herein, e.g. more than 15 wt %, 20 wt %, 25 wt % or even more than 30 wt %. In another embodiment, the pigment paste comprises more than 35 wt % or even more than 40 wt % of the alkyd. In another aspect, the embodiments herein relate to a pigment paste comprising at least 50 wt % of the alkyd. In still another aspect, the embodiments herein relate to a pigment paste comprising at least 60 wt % of the alkyd, e.g. at least 70 wt %, 80 wt % or even at least 90 wt %. In some embodiments, the one or more iron oxide pigments are selected from the group consisting of yellow iron oxide, orange iron oxide, red iron oxide, brown iron oxide and black iron oxide, or mixtures thereof. In other embodiments, yellow, orange and red iron oxide pigments or mixtures thereof are selected. Such iron oxide pigments can be transparent or alternatively opaque.

In one aspect the one or more iron oxide pigments in the pigment paste described herein are transparent iron oxide pigments. So in one aspect, the embodiments herein relate to a pigment paste comprising the alkyd as herein defined and further comprising one or more transparent iron oxide pigments. Alternatively, in one embodiment the embodiments herein relate to a pigment paste comprising a solution of the alkyd as herein defined and further comprising one or more transparent iron oxide pigments.

So, in one aspect the embodiments herein relate to a colour paste comprising the alkyd as herein defined and further comprising 20-40 wt % of transparent iron oxide pigments; in one aspect the iron oxide pigments are transparent red or yellow iron oxide pigments or mixtures thereof.

The pigment paste described herein is solvent borne (i.e. organic solvent based).

In another aspect the viscosity of the pigment paste described herein does not increase with more than 10% when exposed to air for 2 months or more, (or 3, 4, 5, 6, 7, 8, 10, 12, 16, 20, 24 months).

In yet another aspect the viscosity of the pigment paste described herein comprising transparent iron oxide pigments does not increase with more than 10% when exposed to air for 2 months or more, (or 3, 4, 5, 6, 7, 8, 10, 12, 16, 20, 24 months).

The pigment paste as herein described can be used to make a coating composition e.g. an architectural or trim coating. In one aspect the embodiments herein relate to an coating comprising the pigment paste described herein.

The pigment paste may be prepared by a process comprising the step of mixing or dispersing a pigment in the alkyd as herein defined. The pigment may be mixed or dispersed in a solution comprising the alkyd. In some embodiments, the pigment is an iron oxide pigment, or a mixture of one or more iron oxide pigments as herein defined.

The alkyd can be prepared using methods known in the art of alkyd preparation chemistry. The alkyd may be produced by a process comprising the steps of:
  a. producing an OH-functional alkyd from a non-drying oil or fatty acid, one or more polyols, and a first anhydride; wherein the non-drying oil or fatty acid has an iodine number 115;
  b. esterification of the OH-functional alkyd of step a) with trimellitic anhydride (TMA) at a temperature 220° C.; or between 100 and 200° C. or between 100° C. and 180° C., or between 100 and 150° C.;
  optionally wherein in step a) water is removed azeotropically.

It is understood that step a)—the preparation of an OH-functional alkyd—of the process to produce the alkyd, can be done in one or two stages. In the 2-stage process the fatty acid and the one or more polyols are reacted to yield intermediate product 1. For example by heating in an inert atmosphere to a temperature of about 200° C. for 1 hour. In the second stage, the OH-functional alkyd is prepared by reacting intermediate product 1 with the anhydride (for example by adding the anhydride to intermediate product 1 and heating to about 230° C. while removing water azeotropically, until the desired acid value has been reached). In this 2-stage process, part of the total amount of one or more polyols may be added at the second stage.

In the one-stage reaction, all the fatty acid, the one or more polyols and the anhydride are reacted at about 230° C. while removing water azeotropically, until the desired acid value has been reached.

The anhydride group of TMA is more reactive than the carboxylic acid group in TMA. Hence by keeping the temperature 220° C. during step b)—esterification of the OH-functional alkyd—only the anhydride function of TMA will react with a free hydroxyl group of the OH-functional alkyd. At higher temperatures also the second and/or third carboxylic acid group of TMA will react with a free hydroxyl of the OH-functional alkyd. In order to get the desired functionality in the alkyd, the majority of the TMA residues should have 2 free carboxylic acid groups, e.g. more than 75% of the TMA residues, such as more than 85%, 90%, 95% or even more than 98% of the TMA residues should have 2 free carboxylic acid groups. This can be monitored by comparing the Mn or Mw of the alkyd obtained in step b) with the Mn or Mw, respectively, of the OH-functional alkyd. When, in addition to the anhydride group, one carboxylic acid group of a TMA residue has reacted with an OH-group of the OH-functional alkyd, that will result in a doubling of Mn or Mw of the alkyd obtained in step b) when compared to the OH-functional alkyd. In one embodiment, the Mn of the alkyd obtained in step b) is equal to {the Mn of the OH-functional alkyd as obtained in step a) +molecular weight of TMA}. In another embodiment, the Mw of the alkyd obtained in step b) is equal to {the Mw of the OH-functional alkyd as obtained in step a) +molecular weight of TMA}.

In one embodiment, in step a) of the process to make the alkyd the one or more polyols are selected from the group consisting of glycerol, trimethylol propane (TMP), and pentaerythritol, and in some embodiments wherein the one or more polyols are glycerol and pentaerythritol.

In another embodiment, in step a) of the process to make the alkyd the first anhydride is phthalic anhydride or hexahydro phthalic anhydride, and in some embodiments is hexahydro-phthalic anhydride.

In still another embodiment, in step a) of the process to make the alkyd the one or more polyols are glycerol and pentaerythritol; and the first anhydride is hexahydro-phthalic anhydride.

Definitions

Gelling of pigment paste is defined herein as an increase in the viscosity of a pigment paste until the paste behaves as a solid (no flow). When the viscosity is too high, it is difficult or impossible to mix (or disperse) the pigment paste in a base paint obtaining a uniformly colored paint. Extreme gelling may result in the formation of big pieces of very hard material in the pigment paste which make the pigment paste unsuitable for usage in tinting systems.

Pigment paste is herein defined as a carrier of pigments. It means a concentrated colloidal dispersion of coated or uncoated coloured particles in a continuous medium, optionally stabilized using a dispersant. The continuous medium being an alkyd dissolved in an organic solvent. A pigment paste can for example be added to a base paint (or base coating) to adjust the color of the base paint.

A base paint (or base coating) is herein defined as a paint (e.g. architectural or trim) which can be colored in the desired color at a point of sale by adding specific amounts of pigment paste. A base paint may for example be light or dark coloured, and in some embodiments it is light coloured e.g. white.

Volatile Organic Compounds (VOC) are herein defined in accordance with DIRECTIVE 2004/42/CE and means any organic compound having an initial boiling point less than or equal to 250° C. measured at a standard pressure of 101.3 kPa.

Powdered pigments have the disadvantage that they can be difficult to distribute homogeneously in the mass (e.g. a base coating), are difficult to meter and the color dust easily contaminate the environment. It is therefore very early gone over with corresponding binder-solvent systems to mix the color pigments to color concentrates, which can then much more easily be stirred into the base. Such a concentrate is herein referred to as pigment paste. A pigment paste can be dosed on the volume and can be handled as liquids which are easier handling of dry powdered pigment. A pigment paste can be stirred in products (e.g. base paint) of the same binder and solvent composition.

Iodine number (or "iodine adsorption value" or "iodine value" or "iodine index") is herein defined as the mass of iodine in grams that is consumed by 100 grams of a chemical substance. Iodine numbers are often used to determine the amount of unsaturation in oils or fatty acids. Saturated oils, fats, and waxes take up no iodine; therefore their iodine value is zero; but unsaturated oils, fats, and waxes take up iodine. Unsaturated compounds contain molecules with double or triple bonds, which are very reactive toward iodine. The more iodine is attached, the higher is the iodine value, and the more reactive, less stable, softer, and more susceptible to oxidation is the oil, fat, or wax. Iodine number can be determined using methods known in the art, e.g. ISO 3961.

Mw and Mn can be measured using Gel Permeation Chromatography (GPC) or Size Exclusion Chromatography (SEC) using polystyrene standards using methods known in the art. A possible parameter for controlling viscosity is the number average molecular weight Mn of the alkyd, which in some embodiments is more than 1,500, and in other embodiments is between 2,000 and 2,400 g/mole.

Oil length has an influence on viscosity. Therefore, it is suitable to use an alkyd having an oil length of at least 56 and below 84.

Pigments include inorganic as well as organic pigments. Examples of inorganic pigments include titanium dioxide, zinc oxide, carbon black, iron oxides, bismuth vanadates, raw and burnt sienna or umber, chromium oxide green, cadmium pigments, chromium pigments, etc. Examples of organic pigments include phthalocyanines, quinacridones, quinophthalones, anthraquinones, isoindolines, pyranthrones, indanthrones, derivatives of dioxazine, diketopyrrolopyrroles, azo-compounds, etc. Optionally, filler pigments may be added, such as clay, silica, talc, mica, woolastonite, wood flower, and the like.

High pigment contents can be realized in the pigment pastes according to the present embodiments without the use of high amounts of solvent. If inorganic pigments are used, the pigment content should can be more than 10% by weight or more than 60% by weight. If transparent pigments, e.g. transparent iron oxides, are used, the pigment content can be over 5% by weight, or over 20% by weight, or even over 30%.

If so desired, the pigment pastes according to the embodiments herein may also comprise anti-foaming agents, matting agents, anti-settling agents, anti-skinning agents, such as methyl ethyl ketoxime, and/or other suitable additives.

The pigment paste described herein may be used in a method for tinting paint by selecting a base paint from a set of base paints and subsequently mixing the base paint with one or more of the above-described pigment pastes. Although in theory it is possible to mix all colours using a single clear base paint, generally also white base paints are used in tinting systems to obtain colours with sufficient hiding power.

Different grades of white pigmented base paints may be used, if so desired.

Generally, also a limited number of pre-tinted base paints are used to enhance the scope of the miscible colours with sufficient hiding power. Separate base paints for high-gloss, or satin gloss paints may also be used, if so desired.

"Average" refers herein to the arithmetic mean.

In this document and in its claims, the verb "to comprise" and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there be one and only one of the elements. The indefinite article "a" or "an" thus usually means "at least one".

Examples

The embodiments herein are illustrated by means of the following non-limiting examples.

Alkyd Preparation Method

Oil-Based

Oil based alkyd resin was synthesized in two stages. The oil was charged into a three-necked round bottom flask equipped with a thermometer, mechanical stirrer, condenser, Dean-Stark trap and a nitrogen inlet. The oil was heated to 200° C. The polyols as a reactant and calcium carbonate (catalyst, oil 0.8% up) were added. After the addition the oil was heated to 240° C. Small samples were taken and diluted in anhydrous methanol. If the resulting solution was clear in methanol, it was concluded that alcoholysis step has completed. In second stage the mixture was cooled to 140° C. and the anhydride/poly-acid with xylene was added. The reaction mixture was heated to 240° C. and reaction was pursued until acid number was decreased to 10 mg KOH/g.

Fatty Acid Based

Fatty-acid based alkyd resin was synthesized in one stage. The fatty acid, polyol, and anhydride/poly-acid were charged into a three-necked round bottom flask equipped with a thermometer, mechanical stirrer, condenser, Dean-Stark trap and a nitrogen inlet. The reaction mixture was heated to 240° C. Xylene was added to remove water azeotropically. The reaction was pursued until acid number was decreased to the desired level, i.e. 10 mg KOH/g.

Acid Value Determination

The acid value was determined in accordance with ISO 2114.

Pyridine Acid Value Determination

The pyridine acid value determination was used to determine the acid value of the alkyd and of any unreacted anhydride present in the sample. If the value of the pyridine AV is equal to the normal AV; i.e. (pyridine AV—"normal" AV)<1 mg KOH/g., then no residual anhydride is present in the sample.

Dissolve about 1.5 grams of sample in 50 ml pyridine/water (3:1 vol:vol). Heat the sample to 80° C. for 1 hour. Cool to room temperature. Determine the acid value of the sample according to ISO 2114.

Oscillated Rheology Method

The oscillated rheology method is an accelerated stability test which measures the viscosity increase. The protocol allows a drawdown of a pigment paste to dry after which the oscillated viscosity is measured.

A drawdown of the pigment paste was made on a BYK opacity Chart PA-2857 using a K-Control coater with application bar s1.0. The film was allowed to dry for 3 days at 23° C.

After drying, the chart was placed on a place holder of a Paar Physica MCR300 that was equipped with plate PP12.5 (plate-plate geometry with a diameter of 12.5 mm). The gap was set to 20 μm. The oscillated viscosity was measured at 1 degree at a frequency of 10 s$^{-1}$.

Determination of Iodine Value

The iodine value (commonly known as IV) of animal or vegetable fats and oils was determined according to ISO 3961

Drying Time Until Surface Dry at 23° C.

Drying times were determined by BK drying on a BK or drying recorder (wet film thickness 90 μm; ASTM D5895-96). After the application of the film on a glass strip (B.K. recorder: 69×2.5 cm) a vertical blunt needle, pressed upon by a 5 g load, is placed into the freshly applied film and then dragged through the drying paint in a direction parallel to the edges of the strip.

The three stages of BK drying in the experiment were as follows: i) the (wet) 15 paint flows together (leveling); b) the paint has begun to polymerize but a line left by the needle is visible or traceable (basis trace); and c) drying has proceeded sufficiently that the film of paint is not displaced by the needle (the so-called "surface dry time").

Pigment Paste Preparation

Pigment pastes were prepared by dispersing the desired pigment (e.g. iron oxide pigment) (25-35 wt %) in a solution of the alkyd (50-60 wt %) in Shellsol D60 (10-15 wt %) with an anti-skinning agent (0-1 wt %). The amounts in wt % of the individual components should add up to 100%.

Reference Compound 1

Existing red and yellow colorants comprising iron oxide pigments based on Comparative alkyd 1 are known. A problem with these colorants is gelation of the colorant while stored in the mixing machine canisters. This gelation causes the formation of solid particles in the canister which makes the colorant unsuitable for coloring of a base paint.

Reference compound 1 is an AkzoNobel proprietary compound which is a long oil alkyd (oil length=65%). It's based on a specific oil (oil 1), an anhydride, 2 different polyols and synthesized by polycondensation under azeotropic xylene reflux. The composition of Comparative alkyd 1 is described below.

The oil/fatty acid used in this preparation (oil 1) had the following fatty acid composition:

| | |
|---|---|
| about 3% | of C16:0 + C17:0 + C18:0 + C20:0 |
| about 27% | of C18:1 (oleic acid) |
| about 60-65% | of C18:2 + C18:3 + C20:3 |
| rest | unidentified fatty acids. |

The iodine value of the oil was 154 g I$_2$/100 g.

Replacing Oil 1 with Oleic Acid

Oil 1 in comparative compound 1 was replaced with oleic acid (OA). In order to determine the effect of the amount of oleic acid, the ratio of oil 1:OA was changed from 100:0 to 0:100; wherein Nouracid® HE1885 was used as source of OA. The amount of the other components in comparative compound 1 were not changed:

| Composition | Reference compound number | | | | |
|---|---|---|---|---|---|
| (wt %) | 1 | 2 | 3 | 4 | 5 |
| Oil 1 | 58.2 | 43.6 | 29.1 | 14.6 | 0 |
| Nouracid® HE1885* | 0 | 14.6 | 29.1 | 43.6 | 58.2 |
| Polyol 1 | 6.9 | 6.9 | 6.9 | 6.9 | 6.9 |
| Polyol 2 | 11.5 | 11.5 | 11.5 | 11.5 | 11.5 |
| Anhydride | 23.4 | 23.4 | 23.4 | 23.4 | 23.4 |
| Oil 1:OA | 100:0 | 75:25 | 50:50 | 25:75 | 0:100 |
| Iodine number | 154 | 138 | 122 | 106 | 90 |

*Nouracid® HE1885 from supplier Oleon comprising 80-90 wt % of oleic acid (OA), iodine value 85-95 g I$_2$/100 g Reference compounds 2-5 were prepared following the same procedure as described for reference compound 1 here above.

Pigment Paste

A pigment paste comprising iron oxide pigments was prepared of reference compounds 1 to 5. The pigment paste prepared from reference compound 1 was prepared twice, once with and once without anti-oxidant. The pigment paste was prepared according the protocol listed above with identical amounts of the different components.

The gelling of pigment pastes 1-5 was determined using Oscillated Rheology (i.e. viscosity) using the method as described above. The gelling results measured are shown below:

| Reference compound | Oscillated Rheology (kPa · s) |
|---|---|
| 1* | 28.0 |
| 1 + antioxidant | 4.0 |
| 2* | 12.1 |
| 3* | 7.5 |
| 4* | 2.0 |
| 5* | 1.2 |

*without anti-oxidant.

The accelerated gelling test showed that replacement of oil 1 by OA leaded to less increase of viscosity. The pigment paste containing the resin with 75% Nouracid® HE1885 showed a lower increase in viscosity than the paste containing reference compound 1 with anti-oxidant. The curve that was fitted through the results of reference compounds 1-5 indicated that at least 65 to 70% Nouracid® HE1885 was required to get the same gelling behavior as with reference compound 1 with anti-oxidant, as is illustrated in FIG. 1. This corresponds to an iodine number of 115 g I$_2$/100 g. Addition of anti-oxidant to reference compounds 2-5 may further improve the stability of the pigment paste.

Pigment pastes prepared from an alkyd wherein the alkyd was prepared of a non-drying oil or fatty acid, one or more polyols, and a first anhydride; wherein the non-drying oil or fatty acid has an iodine number ≤115 (i.e. an alkyd according to the embodiments herein); the pigment paste further comprising iron oxide pigments showed an increase in accelerated viscosity determination (Oscillated Rheology) that was similar or lower than 4 kPa·s; in other words equal to or lower than that of a pigment paste prepared from reference compound 1 with anti-oxidant. In various embodiments, the level of anti-oxidant was kept as low as possible to prevent drying-retardation of the final paint.

A pigment paste was prepared from an alkyd resin wherein 100% of the non-drying oil or fatty acid has an iodine number of 85-95 g I$_2$/100 g of oil or fatty acid, this paste showed no significant increase in viscosity.

In addition, absence of oxidative crosslinking was determined by measuring the molecular weight of the pigment paste over time while exposed to air. Alkyd resins wherein 100% of the non-drying oil or fatty acid was oleic acid (OA) showed less than 10% weight increase after 11 days. A pigment paste prepared from such an alkyd, showed less than 50% molecular weight increase (as determined using Gel Performance Chromatography) when exposed to air for 11 days (from 7.5 kDa to 10 kDa; i.e. about 33%). Repetition of these oxidation experiments under inert conditions (exposure to $N_2$ atmosphere instead of air) showed no increase in molecular weight.

The drying behavior of a paint prepared from a base paint and a pigment paste prepared from an alkyd resin wherein 100% of the non-drying oil and fatty acid is oleic (OA) i.e. 100% Nouracid® HE1885 was tested using the BK Drying test. This test revealed that replacing oil 1 with OA had no effect on the drying time (end of phase 3) when performed at 23 or 10° C.

Replacing Oil 1 with Other Fatty Acids

Various less-reactive fatty acids were compared with each other. The compositions of the tested fatty acids are presented in the table below:

| Fatty acid Trade name Supplier | Oleic acid Nouracid HE1885 Oleon | Isostearic acid Radiacid 0907 Oleon | Laurie Acid Radiacid 0624 Oleon | |
|---|---|---|---|---|
| C6 | | | 0.2 | % |
| C8 | | | 4.2 | % |
| C10 | | | 5.1 | % |
| C12 | | | 52.7 | % |
| ≤C14 | 0-2 | | | |
| C14 | | | 17.8 | % |
| <C16 | | 1.5 | | % |
| C16 | 0-6 | 7 | 8.7 | % |
| C18 | 0-7 | 3 | 1.0 | % |
| C18:1 | 80-90 | 1 | 8.8 | % |
| C18:2 | 0-10 | | 1.3 | % |
| C18:3 | 0-1 | | | |
| C16-18 branched | | 87 | | % |
| C18 Lactone | | 0.2 | | % |
| C20 | | 0.3 | | % |
| ≥C20 | 0-2 | | | |

-continued

| Fatty acid Trade name Supplier | Oleic acid Nouracid HE1885 Oleon | Isostearic acid Radiacid 0907 Oleon | Laurie Acid Radiacid 0624 Oleon | |
|---|---|---|---|---|
| Others | | | 0.2 | % |
| Iodine value | 85-95 | 6 | 10.3 | $gI_2/100g$ |

Gelling/viscosity measurement and drying experiments with alkyds made of Isostearic acid (Radiacid 090715) or Lauric Acid (Radiacid 062416) showed that pigment pastes based on these fatty acids performed worse than those based on Oleic acid. Viscosity of pigment pastes based on isostearic acid-based alkyd or lauric acid-based alkyd was higher compared to oleic acid. Pigment pastes based on isostearic acid-based alkyd or lauric acid-based alkyd required more solvent to reduce the viscosity. Accordingly, pigment pastes based on oleic acid are suitable. This experiment showed that not just any less reactive fatty acid solved the viscosity increase/gelling problem.

Long Term Stability of a Pigment Paste Based on Reference Compound 5.

Samples of pigment paste based on reference compound 5 showed a significant viscosity increase and color change during stability tests at 50° C. This instability could not have been caused by oxidative crosslinking, because Reference Compound 5 does not show oxidative crosslinking (see above). Moreover, the stability tests were performed in highly filled, closed jars, so there was very little oxygen available.

Some viscosity measurements were performed and these showed that the samples were strongly pseudo plastic. This means that they had a very high viscosity at low shear, but a much lower viscosity at high shear. Some fresh samples were also measured and these did not show pseudo plastic behavior. The fact that the instable samples show pseudo plastic behavior indicated that the pigment stabilization of the pastes was not very good. It also confirmed that no oxidative crosslinking had taken place, because then the viscosity would have been high at all shear rates, and not only at low shear.

Esterification of Reference Compound 5

Reference compound 5 (an alkyd) was esterified with different anhydrides to determine pigment paste stability of a pigment paste prepared from the esterified alkyd.

| Part | Name * | Compound A weight (g) | wt % | Compound B weight (g) | wt % | Compound C weight (g) | wt % |
|---|---|---|---|---|---|---|---|
| A | Reference compound 5 ** | 1240.70 | 99.18 | 1240.70 | 98.71 | 1240.70 | 98.56 |
| B | Trimellitic Anhydride (TMA) | 10.30 | 0.82 | | | | |
| | Phthalic anhydride (PA) | | | 16.2 | 1.29 | | |
| | Hexahydro phthalic anhydride (HHPA) | | | | | 16.8 | 1.34 |

* TMA = Trimellitic Anhydride, PA = Phthalic anhydride, HHPA = Hexahydro phthalic anhydride (HHPA)
** reference compound 5 was added as a solution with a solids content 80.6%. The added amount corresponds to 1000.0 g solid resin.

Compounds A to C were prepared by adding part A to a flask fitted with a cooler, stirrer and thermocouple, the air in the flask was replaced with nitrogen atmosphere. The reaction mixture was heated to 110° C., followed by addition of part B and reacting the mixture at 110° C. until all anhydride has reacted (pyridine AV—"normal" AV)<1 mg KOH/g.

Pigment pastes were prepared from the modified resins (compounds A, B and C) and these pastes were subjected to stability tests at 50° C. It was found that that the paste containing the TMA-modified resin (Compound A) had a much better stability than the paste containing reference compound 5. It showed less viscosity increase, less color change and less decrease in transparency after stability testing at 50° C., compared to the reference paste based on reference compound 5. The pastes containing the PA- and HHPA-modified resins did not show a significant improvement of tinter stability. This indicates that the simple introduction of more carboxylic acid is not the only mechanism to improve stability.

The improvement with the TMA modified resin (Compound A) over a paste containing reference compound 5 is clearly shown in FIG. 2. The paste containing reference compound 5 showed strong pseudo plasticity after 12 weeks at 50° C., while the paste containing compound A remained Newtonian, which is the desired property for use in tinter dispensers.

The invention claimed is:

1. A solvent borne pigment paste comprising an alkyd and one or more iron oxide pigments
   wherein the alkyd is obtainable by a process comprising the steps of
   a. producing an OH-functional alkyd from a non-drying oil or a fatty acid, one or more polyols, and a first anhydride; wherein the non-drying oil or fatty acid has an iodine number ≤100 and >15 $I_2$/100 g;
   b. esterification of the OH-functional alkyd with trimellitic anhydride (TMA) at a temperature ≤220° C. to obtain an alkyd with esterified TMA residues, wherein at least 80% of the esterified TMA residues has two free carboxylic groups,
   wherein an acid value of the alkyd is between 15 and 30 mg KOH/g, and wherein the iodine number is determined according to ISO 3961 and the acid value is determined according to ISO 2114.

2. The pigment paste of claim 1, wherein esterification of the OH-functional alkyd with trimellitic anhydride (TMA) is at a temperature between 100° C. and 200° C.

3. The pigment paste of claim 1, wherein an amount of fatty acid with 18 carbon atoms and two double bonds (C18:2) and C18:3 in the non-drying oil or fatty acid is less than 20 wt %.

4. The pigment paste of claim 1, wherein an amount of fatty acids with less than 16 carbon atoms (<C16) in the non-drying oil or fatty acid is less than 10 wt %; or wherein an amount of fatty acids without unsaturations (C16:0) and fatty acids with 16 carbon atoms and one unsaturation (C16:1) in the non-drying oil or fatty acid is less than 15 wt %.

5. The pigment paste of claim 1, wherein the amount of fatty acid with 18 carbon atoms and one double bond (C18:1) and isostearic acid in the non-drying oil or fatty acid is ≥40 wt %.

6. The pigment paste of claim 5, wherein the non-drying oil or fatty acid comprises more than 52 wt % of oleic acid.

7. The pigment paste of claim 1, wherein the one or more polyols comprise at least one member selected from a group consisting of glycerol and pentaerythritol and wherein the first anhydride comprises at least one member selected from a group consisting of phthalic anhydride and hexahydrophthalic anhydride.

8. The pigment paste of claim 1, wherein the alkyd has a Number Average Molecular Weight (Mn) of between 2000 and 3500 Da; or wherein the Weight Average Molecular Weight (Mw) is between 5000 and 10,000 Da; and/or wherein the Mw/Mn ratio is between 1 and 3, and wherein Mn and Mw are measured using Gel Permeation Chromatography using polystyrene standards.

9. The pigment paste of claim 1, wherein the acid value of the OH-functional alkyd is between 10 and 25 mg KOH/g.

10. The pigment paste of claim 1, wherein the acid value of the alkyd is between 16 and 25 mg KOH/g.

11. The pigment paste of claim 1, wherein the pigment paste comprises at least 15 wt % of the alkyd.

12. The pigment paste of claim 1, wherein the iron oxide pigments are selected from the group consisting of yellow iron oxide, orange iron oxide, red iron oxide, brown iron oxide and black iron oxide, or mixtures thereof.

13. The pigment paste of claim 1, wherein the iron oxide pigments are transparent iron oxide pigments.

14. A coating comprising the pigment paste of claim 1.

15. The pigment paste of claim 1, wherein at least 98% of the esterified TMA residues have two free carboxylic groups.

16. The pigment paste of claim 1, wherein esterification of the OH-functional alkyd with trimellitic anhydride (TMA) is at a temperature between 100° C. and 180° C.

17. The pigment paste of claim 1, wherein esterification of the OH-functional alkyd with trimellitic anhydride (TMA) is at a temperature between 100° C. and 150° C.

18. The pigment paste of claim 1, wherein an amount of fatty acid with 18 carbon atoms and two double bonds (C18:2) and C18:3 in the non-drying oil or fatty acid is less than 5 wt %.

19. The pigment paste of claim 1, wherein the acid value of the OH-functional alkyd is between 13.5 and 16 mg KOH/g.

* * * * *